United States Patent Office 3,781,397
Patented Dec. 25, 1973

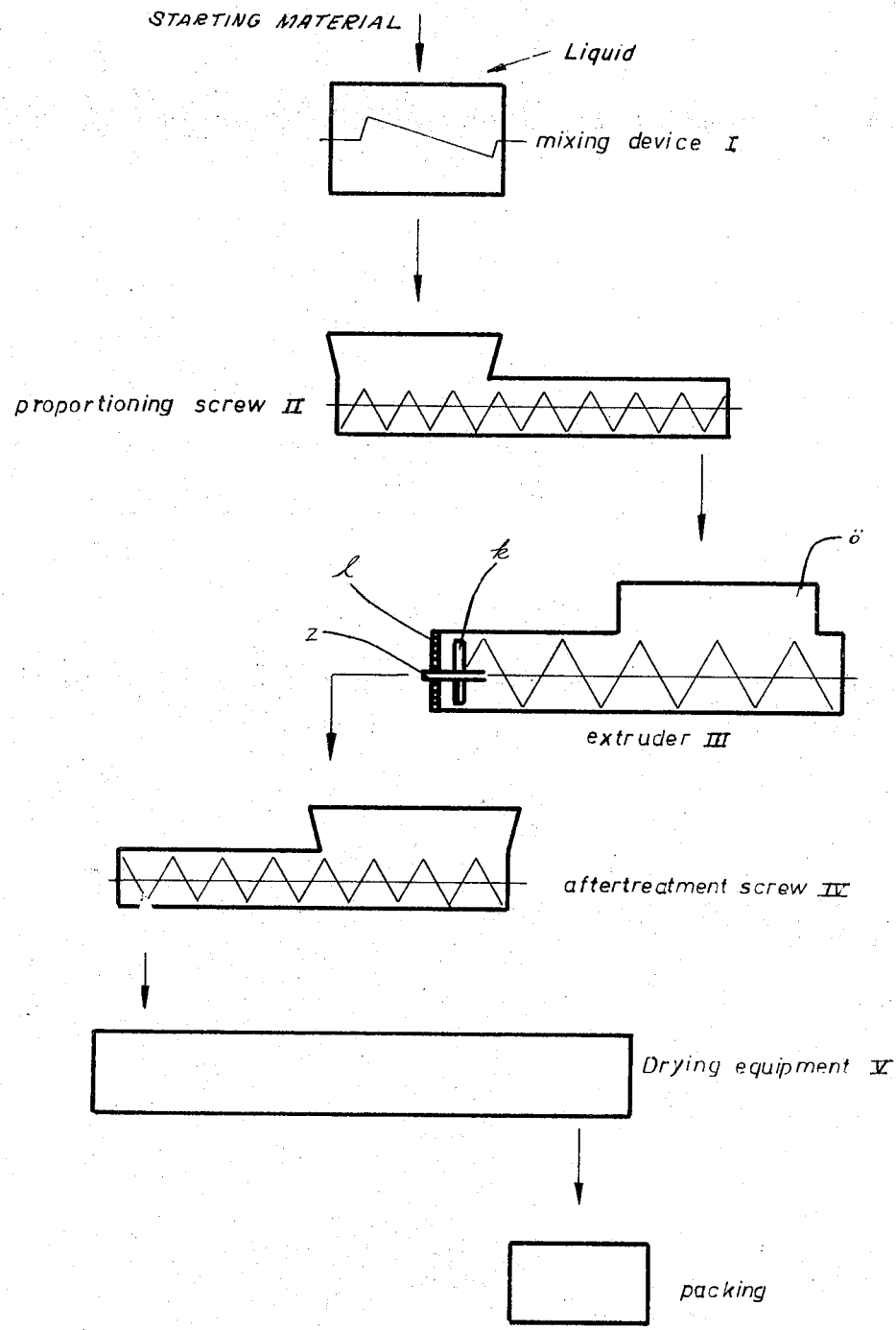

3,781,397
CONTINUOUS PRODUCTION OF PREFORMED MOLDING MATERIALS
Richard Gauer, Wiesbaden, and Uwe Skurnia and Manfred Richter, Wiesbaden-Biebrich, Germany, assignors to Chemische Werke Albert, Wiesbaden-Biebrich, Germany
Continuation of abandoned application Ser. No. 777,299, Nov. 20, 1968. This application Dec. 10, 1970, Ser. No. 96,983
Claims priority, application Germany, Nov. 22, 1967, P 16 29 732.8
Int. Cl. B01j 2/20
U.S. Cl. 264—142      3 Claims

ABSTRACT OF THE DISCLOSURE

A process for the continuous production of dust-free preformed molding materials, substantially uniform in geometrical and physical properties and chemical constitution, in a single step and without an intermediate drying, wherein a hardenable synthetic resin is mixed with reinforcing materials and additives in a mixing device, then continuously fed by a metering screw into an extruder provided with a perforated disc and a cutter head, in which it is compressed, preformed and precut, wherein the extrudate is passed to an aftertreatment screw wherein it is divided in granules having a substantially uniform length, smooth surface and rounded ends and then dried.

---

This is a continuation of application Ser. No. 777,299, filed Nov. 20, 1968, and now abandoned.

The invention relates to the continuous production of preformed molding materials.

Preformed molding materials made from hardenable synthetic resins which are soluble in water and/or organic solvents and pulverulent and/or fibrous fillers or reinforcing substances, dyes, lubricants and other conventional additives are known and generally transformed into molded articles by means of automatically operated injection transfer and injection molding machines. They must therefore be dust-free and their particles must have a geometrical structure which is as uniform as possible and accordingly must have a length which is as uniform as possible in order to facilitate a uniform feed to the mold. A uniform feed is indispensible to the uniformity of the resulting solid molded articles.

This requirement can be partially met by comminuting dried granulates of different length in a suitable milling device with a sieve insert. However, a larger or smaller amount of dust is obtained, depending on the nature and structure of the molding material; at the working method, so far used, the formation of dust was particularly caused by the necessity that after mixing at first granulates of different size had to be dried and then both to be comminuted and sieved in a dry condition; the object of mitigating this disadvantage thus exists. According to the invention this disadvantage can be avoided by transferring the admixture which is still moist, i.e. without an intermediate drying, continuously and in a single step into the desired form.

As well as a uniform shape, the molding material should have uniform processing properties to ensure trouble-free automatic processing. The distribution of the components in the material must be as homogeneous as possible and the flow and hardening properties of the individual grains should be as uniform as possible. While a homogeneous distribution of the components of the molding material can be achieved fairly readily by mixing, e.g. in a mixer kneader, the achievement of uniform flow and hardening properties in the granulate is rendered more difficult in that these properties must be adjusted during the drying process, during which both the chemical process of the initial cross-linking of the resins and drying take place simultaneously. Thus there results the further problem of bringing the moist preformed extrudates uniformly, i.e. with an equal as possible residence times in the drying zone, into the desired final state.

It is accordingly an object of the invention to enable continuous production of dust-free, preformed molding materials with a uniform geometrical structure and a uniform processing state, i.e. with a geometrically, physically and chemically uniform structure, in a simple and economical manner.

According to the invention there is provided a process for the continuous production of a dust-free preformed molding material substantially uniform in geometrical and physical properties and chemical constitution comprising the steps of:

(a) Mixing at least one hardenable synthetic resin, which is soluble in water or an organic solvent, at least one filling or reinforcing material and one or more additives, in a mixing device until they become moldable, (b) Continuously feeding the mixture by means of a metering screw into, (c) An extruder provided with a perforated disc and a cutter head, advantageously a cross flanged cutter head, in which the mixture is compressed, preformed and precut, (d) Passing the extrudate to an aftertreatment screw wherein it is divided into granules having a substantially uniform length, smooth surfaces and rounded ends, and (e) Drying the granules to give them desired flow and hardening properties.

An apparatus which is suitable for carrying out the aforementioned process includes in cooperating relation:

(a) A mixing device I,
(b) A metering screw II,
(c) an extruder III provided with a perforated disc $l$ and a cutter head $k$,
(d) An aftertreatment or conditioning screw IV, and
(e) A drying device V.

One embodiment of the apparatus suitable for the invention is illustrated diagrammatically and by way of example in the accompanying drawing. The apparatus consists of a mixing device I for mixing the starting materials until they become moldable, a metering screw II for conveying them, an extruder III with a perforated disc $l$ and a cutter head $k$ for continuously preforming them, an aftertreatment or conditioning screw IV for dividing and molding them into uniform divided granules, and a suitable drying device V. As mixing device I, preferably a mixer kneader, e.g. a divided trough kneader is used. As extruders III those of conventional construction may be used. An extruder having a screw, a perforated disc and an internal cutter head will preferably be used, but machines with an external cutter head or with internal and external cutter heads are also suitable. The perforated disc can have bores of about 1 to 15 mm., preferably 2 to 8 mm. As aftertreatment screw IV, e.g. a conveyor or metering screw may be used, preferably one which is adjustable in respect of its rate of revolution and/or may be heated or cooled. As drying device, e.g. a belt drier, a fluidized bed dried or a vibrating drier may be used; preferably a continuous belt drier or a vacuum drier is used.

The process according to the present invention is suitable for the production of molding materials based on thermosetting cross-linking synthetic resins soluble in water and soluble in an organic solvent for example acid- or alkaline-condensed phenol-aldehyde resins, amine-aldehyde resins, polyester resins, epoxy resins or co-condensates of these resins, e.g. phenol-amine-aldehyde resins, etc.

In practice the process according to the invention will generally be effected as follows with reference to the apparatus described above.

In a mixing device I, for example a mixer kneader, the resin solution, which can also contain dissolved and/or emulsified lubricants, dyestuffs, and if desired further additives, is thoroughly mixed with the fillers and/or reinforcing material so that a thorough impregnation of absorptive fillers and the best possible homogenization are obtained. If the amount of water or of organic solvent contained in the resin or the resin solution is insufficient to provide for the desired moldability, the quantity of liquid necessary therefore can be readily worked in after homogenization has taken place, e.g. in the form of water or an aqueous solution or suspension of natural or synthetic resins.

The material thus obtained is present in a relatively finely divided form and can be satisfactorily fed by means of a metering screw II into the inlet ö of an extruder III. It is advantageous to carry out the necessary compression of the material, as well as preforming into extrudates, in a single machine, for which purpose an extruder III having a worm with a compression zone and a perforated disc I as outlet is used. A cutter head k with several cutting faces is mounted on the worm shaft z within the worm housing and in front of the perforated disc l; the cutter cuts up the material conveyed from the worm to the perforated disc and aids the passage of the material through the perforated disc. The extrudates leaving the perforated disc are only preformed by these symmetrically disposed cutting faces; the individual pieces still stick to one another and form extrudates of different lengths. The length of the extrudates deepnds on the flow of material through the extruder, i.e. the metering, the rate of revolution of the worm and the diameter of the bores of the perforated disc, and the length is thus controllable.

The moist extrudates thus obtained can surprisingly be aftertreated or conditioned and conveyed in a metering screw IV without sticking together and—what is particularly important—without abrasion occurring. When being conveyed through the screw IV or helix the shorter or longer extrudates are stressed by bending and shearing forces, whose magnitude depends on the shape, rate of revolution and filling level of the screw, in such a manner that they break at the provided sites of break. Preformed molding materials in the form of granules having a *uniform* particle length can be obtained in this manner by means of a metering screw of sufficient length, which length can again be determined by the method of operation of the extruder III. Moreover, when passing through the aftertreatment screw IV, the extrudates are smoothed on their surface due to the collisions continuously taking place between them and due to friction with the screw wall, and are rounded on their end faces, which results in an increase in the bulk density of the finished product and favors the formation of a uniform particle shape.

According to one feature of the invention, a metering screw which is intended as such only for transport or, as the name indicates, for metering, is used for aftertreatment i.e. for the division, smoothing and rounding, as well as for increasing the bulk density of the extrudates. It is undoubtedly surprising that these effects can be achieved by this device, which is known per se but which is here serving entirely different purposes.

The granulates produced according to the invention are practically completely dust-free, which is an important advantage.

In order that the invention may be better understood the following examples are given by way of illustration only.

EXAMPLE 1

(a) 126 kg. of a 70% methanolic solution of a resin produced from phenol and formaldehyde in the mol ratio of 1:0.95 are blended with 2.5 kg. of magnesium stearate and a solution of 15 kg. of hexamethylenetetramine in 15 kg. of water. The product is thoroughly mixed with 167 kg. of asbestos in a mixer kneader. After a kneading time of several minutes, 32 kg. of water are added and the whole is kneaded for a further few minutes.

(b) The material, brough in this manner into a moldable state, is fed with the aid of a metering screw into the inlet ö of an extruder III (provided with a screw), the screw of which has intake and compression zones.

(c) On the shaft z of the screw a cross flanged cutter head k is mounted and rigidly connected to the screw. The cutter rotates in front of a disc l perforated with bores of a diameter of 3 mm., whereby the material is preformed into extrudates. The length of the extrudates obtained by this working method is about 4 to 5 mm.

(d) The shorter or longer extrudates drop into the inlet of an aftertreatment or conditioning screw. While being conveyed through the helix of the screw, the extrudates are gradually and progressively divided until finally uniform granulates with single extruded pieces of a length of about 5 mm. are present. The individual granules are smoothed thereby and rounded on their end faces.

(e) The moist granules are dried in a continuous belt drier, whereby the residual content of volatile materials (determined by drying for two hours at 110° C.) is adjusted to about 3%.

The dry granules are obtained practically completely dust-free, they are very free flowing and due to their uniform geometrical structure, they can be metered accurately. The material produced according to the invention can be worked up according to conventional molding and transfer molding processes, and with particular advantages on automatically working injection molding machines, into molded articles of satisfactory quality.

The specimens produced according to DIN 7708, Sheet 2, yielded the values summarized in the table following Example 2.

EXAMPLE 2

116 kg. of the 70% resin solution referred to in Example 1, containing in addition 2.0 kg. of zinc stearate and 1.5 kg. of dyestuffs, are thoroughly mixed in a mixer kneader with a solution of 17 kg. of hexamethylenetetraamine in 17 kg. of water, 40 kg. of cotton chips and 40 kg. of cellulose fibers. After a kneading time of one hour, 55 kg. of water are added and thorough mixing is continued for a further few minutes. The material, brought in this manner into a moldable state, is preformed by a screw extruder through a performated disc with bores of 5 mm. The extrudates are further treated in an aftertreatment screw until uniform extruded granules of a maximum length of 10 mm. result.

The moist granules are dried in a continuous belt drier, whereby the residual content of volatile materials (determined by drying for two hours at 110° C.) is adjusted to about 2.5%.

The dry granules are practically completely dust-free, free-flowing and can be metered accurately. The product can be worked up automatically by transfer molding or by injection molding into molded articles of satisfactory quality.

The specimens produced according to DIN 7708, Sheet 2, yielded the following values:

|  | Example 1 | Example 2 |
|---|---|---|
| Bending strength, kg./cm.$^2$ | 502 | 619 |
| Impact strength, kg. cm./cm.$^2$ | 5.3 | 6.0 |
| Notch impact strength, kg. cm./cm.$^2$ | 5.5 | 7.0 |
| Resistance to deformation by heat according to Martens, °C | 149 | 148 |
| Glow resistance (quality degree) | 4 | 3 |
| Surface resistance (treated) +VZ | 8 | 8 |
| Water absorption, mg | 48 | 148 |
| Actual density, g./c.c. | 1.85 | 1.35 |
| Bulk density, g./c.c. | 0.64 | 0.33 |
| Moisture content, percent | 3.2 | 2.84 |
| Processing loss, percent | 0.29 | 0.47 |

NOTE.—+VZ=Comparative value: e.g. $\geq 10^8 < 10^9$ ohm=VZ 8.

In the manner described above, molding materials can also be produced which, instead of the mixture of fibers or chips from cellulose and cotton, contain only one of these reinforcing substances.

It is not intended that the examples given herein should be construed to limit the invention thereto, but rather they are submitted to illustrate some of the specific embodiments of the invention. Resort may be had to various modifications and variations of the present invention without departing from the spirit of the discovery or the scope of the appended claims.

What we claim is:

1. A process for the continuous production of a substantially dust-free preformed molding material substantially uniform in geometrical and physical properties and chemical constitution comprising the steps of:
   (a) mixing in a mixing device a mixture, until it becomes moldable, of materials consisting of:
      (1) at least one thermosetting resin selected from the group consisting of a synthetic thermosetting resin soluble in water and a synthetic thermosetting resin soluble in an organic solvent,
      (2) at least one material selected from the group consisting of a filling material and a reinforcing material,
      (3) at least one additive,
      (4) a solvent selected from the group consisting of water, and an organic solvent and a combination of both,
   (b) feeding said moldable mixture into a metering screw and continuously feeding therefrom into an extruder,
   (c) continuously passing said mixture through said extruder in which said mixture is continuously compressed, preformed and precut with a rotating cutter head and then extruded from a perforated disc as a coherent extrudate comprising precut pieces sticking to one another,
   (d) continuously passing the extrudate to an aftertreatment metering screw wherein the extrudate is continuously divided into granules having a substantially uniform length, smooth surfaces and rounded ends by the conveying movement of the metering screw, and
   (e) drying the granules to give them desired flow and hardening properties.

2. The process of claim 1, in which said synthetic thermosetting resin, soluble in an organic solvent, is a phenol-aldehyde resin.

3. The process of claim 1 wherein said reinforcing material is selected from the group consisting of cellulose chips, cotton fibers and a mixture thereof.

References Cited

UNITED STATES PATENTS

| 3,078,511 | 2/1963 | Street | 264—349 |
| 3,025,564 | 3/1962 | Voigt | 264—142 |
| 3,229,002 | 1/1966 | Feder | 264—15 |
| 3,409,711 | 5/1968 | Pashak et al. | 264—143 |

ROBERT F. WHITE, Primary Examiner

J. R. HALL, Assistant Examiner